Patented Aug. 11, 1925.

1,549,220

UNITED STATES PATENT OFFICE.

RURIC C. ROARK, OF BALTIMORE, MARYLAND, ASSIGNOR TO GENERAL CHEMICAL COMPANY, OF NEW YORK, N. Y., A CORPORATION OF NEW YORK.

INSECTICIDE.

No Drawing.      Application filed March 23, 1922. Serial No. 546,159.

*To all whom it may concern:*

Be it known that I, RURIC C. ROARK, a citizen of the United States, residing at the city and county of Baltimore, State of Maryland, have invented certain new and useful Improvements in Insecticides, of which the following is a specification.

My invention relates to a composition of matter suitable for producing, upon admixture with water, barium tetrasulfid which is a spray material adapted for the spraying of fruit trees, shade trees, shrubs, truck-crops and other or similar plants for the purpose of killing injurious insects, mites, fungous growth or similar infesting growth or growths, or of preventing or mitigating conditions produced by them or any of them.

My invention is based upon the discovery that barium sulfid and sulfur, when mixed, form a substantially stable product which can be shipped for long distances and stored, even in open packages, for a number of months, without substantial change in appearance, or loss of chemical properties, even under what might be deemed adverse climatic conditions.

In order to produce this composition of matter I mix barium sulfid and sulfur, for instance in proportions suitable to produce, when the mixture is placed in solution, barium tetrasulfid; but I may, and in some cases do, add an excess of sulfur, as upon the addition of water to the mixture more sulfur goes into solution than called for by the formation of barium tetrasulfid and any further excess of sulfur is easily kept in suspension and forms in itself an excellent fungicide. For commercial purposes, however, I prefer to mix sulfur in suitable proportions with what is known in the barium industry as black ash, and which is a product containing barium sulfid, barium carbonate, carbon and other materials, usually made from barium sulfate and carbonaceous material.

Thus, when using barium sulfid alone I may employ about 100 parts of this material to approximately 57 parts of sulfur. When using black ash containing (for example) 60% of barium sulfid I may employ 100 pounds of this substance to about 34 pounds of sulfur. As already explained I may, however, for certain purposes add in either case an excess of sulfur; for instance I may add 100 parts of such black ash to 100 parts of sulfur. For commercial purposes I am now using 65 pounds of black ash, containing approximately 60% of BaS, with 35 pounds of finely divided sulfur.

To the mixture described above I add a suitable amount of water, preferably cold, to be used as a spray (for instance from 1½ pounds to 50 gallons of water to 14 pounds of the above described commercial mixture).

One advantage of employing my invention is that the barium sulfid and sulfur are not processed in any manner in the factory but are shipped as a simple mixture. The mixture, as already explained, I have discovered to be substantially stable, much more stable than barium tetrasulfid. The mixture may readily be dissolved by the user in cold water and need not be dissolved in hot water. There is practically no loss due to caking or other changes during shipment or storage. The time of solution is much shorter, in many cases 20% less, than the time needed for dissolving the large, or commercial form, of barium tetrasulfid crystals.

When employing barium sulfid in the form of black ash the further advantage is obtained that the spray made from my composition leaves a marked gray color on the plant which acts as a better marker, that is to say, indicates better than the dissolved barium tetrasulfid crystals, just what portion of the plant has been sprayed.

I desire it to be distinctly understood that I do not claim in my claims anything that is disclosed in United States Letters Patent No. 1,263,856 issued April 23, 1918, upon an invention of Cyril Backus Clark which describes a method of manufacturing barium tetrasulfid and various methods of using barium tetrasulfid as an insecticide.

I claim:

1. The process of making barium tetrasulfid which comprises mixing barium sulfid and sulfur in cold water.

2. The method of manufacturing an insecticidal spray which comprises mixing barium sulfid with sulfur substantially in excess of the amount needed to form barium tetrasulfid, and mixing the same with a suitable quantity of cold water.

3. The improvement in the art of applying barium tetrasulfid to plants which comprises mixing barium sulfid and sulfur in a suitable proportion of cold water and spraying the resulting solution upon a plant.

4. The improvement in the art of applying poly-sulfids containing four atoms of sulfur or more to plants which comprises mixing barium sulfid with an amount of sulfur substantially greater than when necessary to produce barium tetrasulfid adding a suitable quantity of cold water to the mixture and spraying the resulting solution.

5. The process of making barium tetrasulfid which comprises mixing black ash and sulfur in cold water.

6. The improvement in the art of applying barium tetrasulfid to plants which comprises mixing black ash and sulfur in suitable proportions with cold water and spraying the resulting solution upon a plant.

7. The improvement in the art of applying poly-sulfids containing four atoms of sulfur or more to plants which comprises mixing black ash with an amount of sulfur substantially greater than when necessary to produce barium tetrasulfid, adding a suitable quantity of cold water to the mixture and spraying the resulting solution.

8. The composition of matter for use with water to form an insecticide, comprising a mixture of black ash and sulfur.

9. The composition of matter for use with water to form an insecticide, comprising a mixture of black ash and sulfur, the amount of sulfur being substantially in excess of the amount needed to convert the barium sulfid content of the black ash into barium tetrasulfid substantially as and for the purpose described.

10. A composition of matter for use, with water, to form an insecticide, comprising a mixture of barium sulfid and sulfur substantially as and for the purpose described.

In testimony whereof I have hereunto set my hand.

RURIC C. ROARK.